United States Patent
Nagata (10) Patent No.: US 9,784,228 B2
(45) Date of Patent: Oct. 10, 2017

(54) FUEL SUPPLY APPARATUS

(71) Applicant: AISAN KOGYO KABUSHIKI KAISHA, Obu-shi, Aichi-ken (JP)

(72) Inventor: Sadatsugu Nagata, Aichi-gun (JP)

(73) Assignee: AISAN KOGYO KABUSHIKI KAISHA, Obu (JP)

( * ) Notice: Subject to any disclaimer, the term of this patent is extended or adjusted under 35 U.S.C. 154(b) by 0 days.

(21) Appl. No.: 15/160,195

(22) Filed: May 20, 2016

(65) Prior Publication Data

US 2016/0363105 A1 Dec. 15, 2016

(30) Foreign Application Priority Data

Jun. 10, 2015 (JP) ................................. 2015-117250

(51) Int. Cl.
*F02M 61/18* (2006.01)
*F02M 21/02* (2006.01)

(52) U.S. Cl.
CPC ........ *F02M 61/1873* (2013.01); *F02M 21/02* (2013.01); *F02M 21/0266* (2013.01); *Y02T 10/32* (2013.01)

(58) Field of Classification Search
CPC ........... F02M 61/1873; F02M 21/0266; F02M 21/02; F16K 25/00
USPC .......... 251/332–334, 356–357; 277/641, 644
See application file for complete search history.

(56) References Cited

U.S. PATENT DOCUMENTS

| | | | | |
|---|---|---|---|---|
| 2,610,021 A | * | 9/1952 | Smith | F16K 1/34 251/332 |
| 2,995,057 A | * | 8/1961 | Nenzell | F16B 33/004 251/332 |
| 4,165,882 A | * | 8/1979 | Crow | E02B 7/54 277/345 |
| 4,254,960 A | * | 3/1981 | Jelinek | B29C 43/021 277/644 |
| 4,597,583 A | * | 7/1986 | Inciong | F16J 15/121 277/637 |
| 4,616,857 A | * | 10/1986 | Woodman | E21B 17/085 277/626 |
| 6,089,543 A | * | 7/2000 | Freerks | F16K 51/02 251/356 |

(Continued)

FOREIGN PATENT DOCUMENTS

JP 2006-077777 A 3/2006
JP 2007-040245 A 2/2007

(Continued)

*Primary Examiner* — John Bastianelli
(74) *Attorney, Agent, or Firm* — Oliff PLC (57) ABSTRACT

A fuel supply apparatus includes a valve seat, a valve element, and a sealing member formed of a circular-disc or annular shape placed in the valve element to face the valve seat. The valve element includes an outside facing surface corresponding to a surface facing the valve seat and formed more outside than the sealing member in a radial direction thereof. The sealing member includes an annular protrusion protruding toward the valve seat more than the outside facing surface, and a flat portion formed between the outside facing surface and an distal end of the protrusion on a side toward the valve seat in a central axis direction of the sealing member so that the flat portion will contact with the valve seat during valve closing.

6 Claims, 8 Drawing Sheets

(56) References Cited

U.S. PATENT DOCUMENTS

| | | | |
|---|---|---|---|
| 6,173,969 B1* | 1/2001 | Stoll | F16J 15/061 |
| | | | 277/641 |
| 6,390,445 B2* | 5/2002 | Fukano | G05D 16/2013 |
| | | | 251/129.15 |
| 6,530,558 B1* | 3/2003 | Schulz | F02M 25/0836 |
| | | | 251/129.21 |
| 6,629,682 B2* | 10/2003 | Duelli | F16K 51/02 |
| | | | 251/334 |
| 2007/0029413 A1 | 2/2007 | Nakajima et al. | |
| 2009/0045371 A1* | 2/2009 | Kamibayashiyama | F16K 51/02 |
| | | | 251/328 |
| 2009/0108544 A1* | 4/2009 | Sico | F16K 51/02 |
| | | | 277/639 |

FOREIGN PATENT DOCUMENTS

| | | |
|---|---|---|
| JP | 2007-309217 A | 11/2007 |
| JP | 2007-321677 A | 12/2007 |

* cited by examiner

FUEL SUPPLY APPARATUS

CROSS-REFERENCE TO RELATED APPLICATIONS

This application is based upon and claims the benefit of priority from the prior Japanese Patent Application No. 2015-117250, filed Jun. 10, 2015, the entire contents of which are incorporated herein by reference.

BACKGROUND OF THE INVENTION

Field of the Invention

The present invention relates to a fuel supply apparatus for supply of gas fuel.

Related Art

Figure 8:
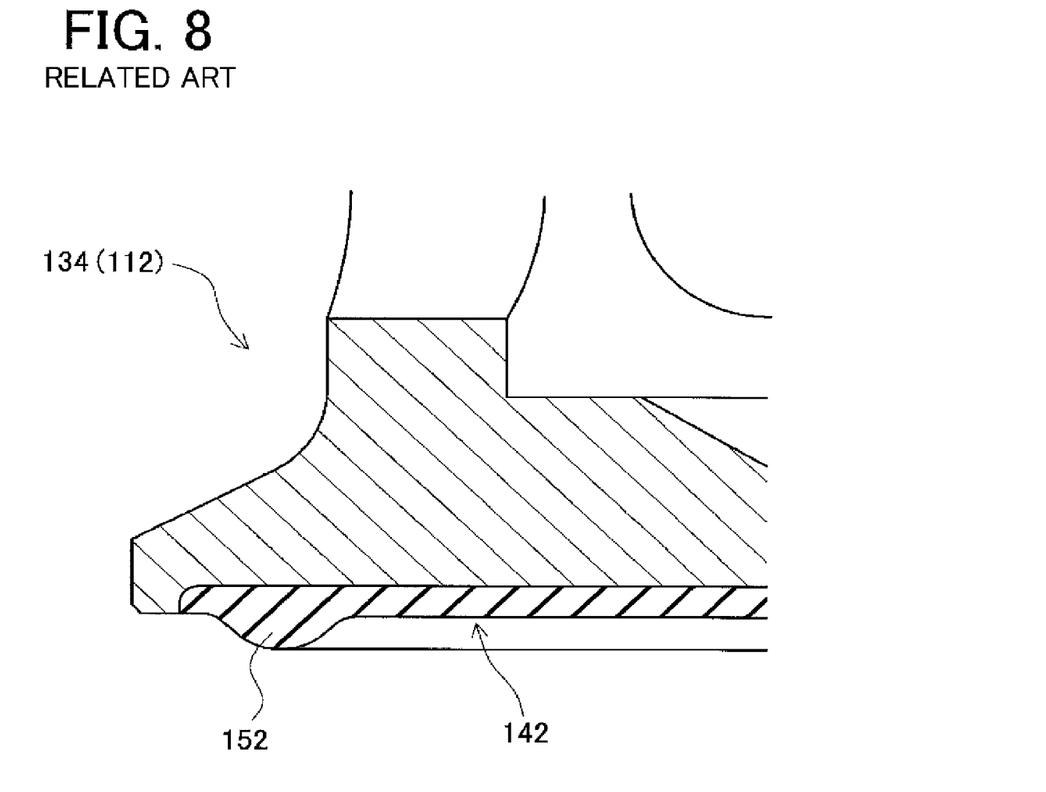
FIG. 8 is a view showing a valve element in a related art.

One of fuel supply apparatus for supply of gas fuel has a valve element 112 shown in FIG. 8. This valve element 112 in FIG. 8 is configured such that a sealing part 134 is provided with a sealing member 142 formed with a protrusion 152 which contacts with a valve seat (not shown) during valve closing. However, when the protrusion 152 is compressed with a large deformed amount during valve closing, the protrusion 152 causes collapse (creep, degradation) due to long term use of the sealing member 142. The original height of the protrusion 152 therefore lowers when the protrusion 152 returns to its original shape during valve opening. This causes decreasing of the elastic force of the protrusion 152 acting on the valve seat during valve closing, resulting in deteriorated sealing performance or strength of the sealing member 142. A stroke amount of the valve element 112 may also vary.

Patent Document 1 discloses a fuel injection valve configured such that one of a valve element and an injection nozzle is provided with a metal contact part which will come into contact with the other during valve closing.

RELATED ART DOCUMENTS

Patent Documents

Japanese unexamined patent application publication No. 2007-309217

SUMMARY OF INVENTION

Problems to be Solved by the Invention

In the fuel injection valve in Patent Document 1, during valve closing, the contact part contacts with the injection nozzle or the valve element, thereby reducing the deformed amount of the sealing member. Therefore, the protrusion less collapses even after the sealing member is used for a long term. This conceivably suppresses deterioration in sealing performance of the sealing member. However, since the metal contact part abuts on the injection nozzle or the valve element, it may generate noise at the time when the valve element is opened and closed.

The present invention has been made to solve the above problems and has a purpose to provide a fuel supply apparatus capable of preventing occurrence of noise and also suppressing deterioration in sealing performance of a sealing member.

Means of Solving the Problems

To achieve the above purpose, one aspect of the invention provides a fuel supply apparatus comprising: a valve seat; a valve element which will come into contact or separate from the valve seat; and a sealing member formed of an elastic body having one of a circular-disc shape and an annular shape, the sealing member being placed in one of the valve element and the valve seat to face the other, the one being defined as a first member and the other is defined as a second member, wherein the first member includes an outside facing surface corresponding to a surface facing the second member, the outside facing surface being formed more outside than the sealing member in a radial direction of the sealing member, and the sealing member comprises: an annular protrusion protruding toward the second member more than the outside facing surface, and a flat portion formed between the outside facing surface and a distal end of the protrusion on a side toward the second member in a central axis direction of the sealing member, the flat portion being to contact with the second member during valve closing.

According to the above aspect, during valve closing, the flat portion comes into contact with the second member. Thus, the area of a contact portion of the sealing member with the second member is larger than that in a case where no flat portion is formed. During valve closing, therefore, the pressure acting on the sealing member from the second member is also dispersed into the flat portion, so that the pressure acting on the protrusion is reduced and an increase in the deformed amount of the protrusion is suppressed. Accordingly, even when the sealing member is used for a long term, the protrusion less collapses and a deformed amount of the protrusion due to collapse is reduced. This can suppress deterioration in sealing performance of the sealing member. Further, during valve opening, the distance between the protrusion and the second member remains nearly unchanged. This can suppress variations in stroke amount (distance) of the valve element when opening or closing.

Furthermore, the flat portion is formed in a position or level between the outside facing surface and the end (a distal end) of the protrusion on the side toward the second member in the central axis direction of the sealing member. Accordingly, during valve closing, the flat portion abuts on the second member, while a clearance is formed between the outside facing surface and the second member, so that the outside facing surface is held in a position away from the second member. This makes it possible to suppress the occurrence of noise of the valve element at the time of opening and closing.

Effects of the Invention

The fuel supply apparatus of the present invention can suppress the occurrence of noise and also suppress deterioration in sealing performance of a sealing member.

DESCRIPTION OF EMBODIMENTS

A detailed description of a preferred embodiment of the whole structure of a fuel injection apparatus (an injector) 1 which is one example of a fuel supply apparatus of the present invention will now be given referring to the accompanying drawings. The fuel injection apparatus 1 is for example an apparatus for supplying gas fuel (e.g., hydrogen) to a fuel battery or cell (not shown) in an electric vehicle.

Figure 1:
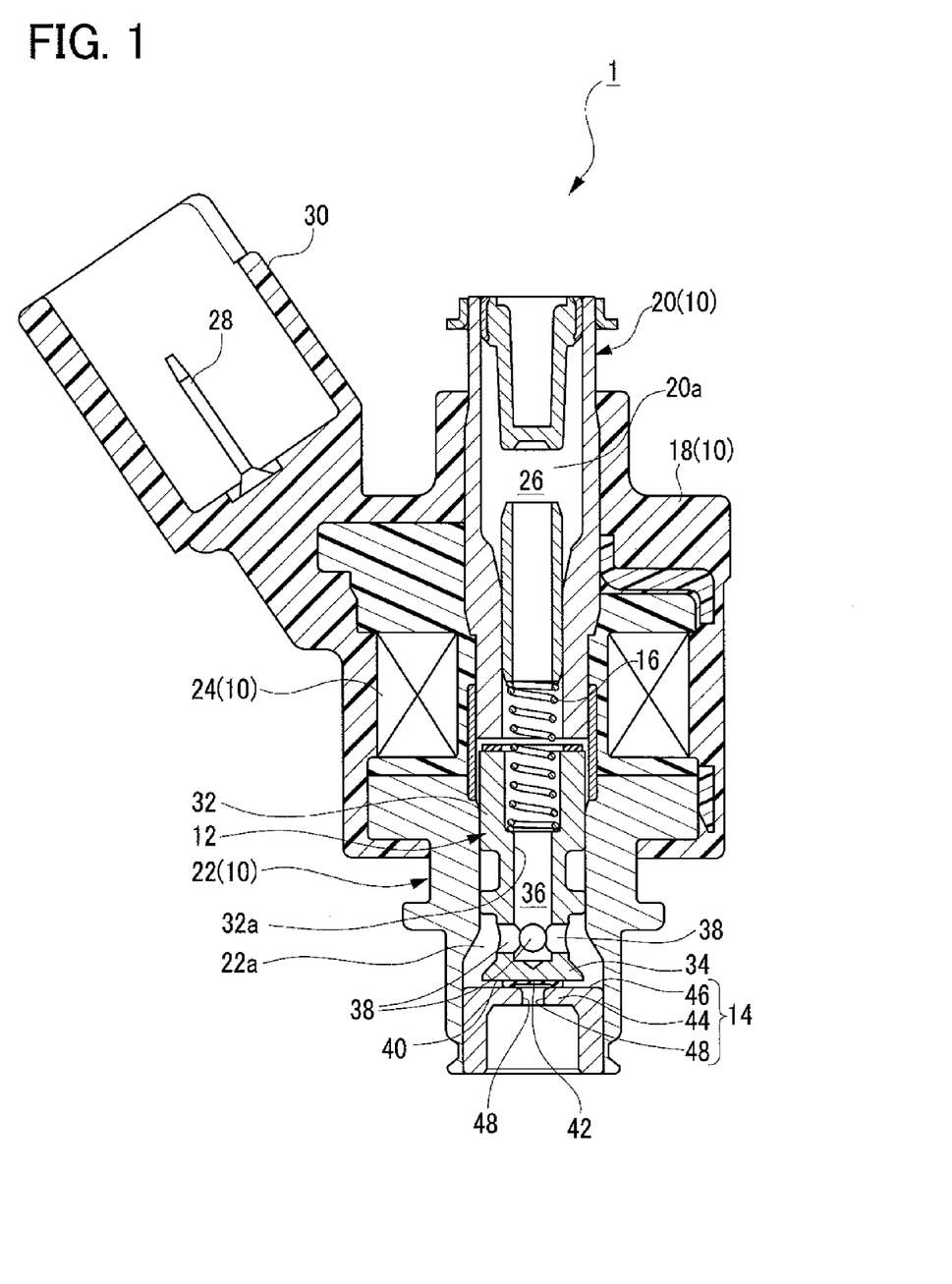
FIG. 1 is a sectional view of a fuel injection apparatus in an embodiment.

The fuel injection apparatus 1 includes, as shown in FIG. 1, a main body 10, a valve element 12, a valve seat 14, a compression spring 16, and others.

The main body 10 is provided with a housing 18, a stator core 20, a casing 22, an electromagnetic coil 24, and others. This main body 10 contains therein the valve element 12, the valve seat 14, the compression spring 16, and others. In the main body 10, a fuel passage 26 is formed to flow gas fuel therethrough.

The housing 18 is designed to surround part of the stator core 20 and part of the casing 22. The housing 18 is made of resin (plastic) and has the electromagnetic coil 24 embedded therein. The electromagnetic coil 24 is placed in a position around the stator core 20. This electromagnetic coil 24 serves as a drive part for driving the valve element 12 to come into contact with or separate from the valve seat 14. The housing 18 is provided with a connector part 30 in which a plurality of terminal pins 28 are arranged. These terminal pins 28 are electrically connected to the electromagnetic coil 24.

The stator core 20 is placed in a position opposite from the valve seat 14 with respect to the valve element 12. The stator core 20 has a nearly cylindrical shape (including an exact-circular cylindrical shape, an elliptic cylindrical shape, etc.) and formed with a through hole 20*a* axially extending in the center. The through hole 20*a* forms an upstream part of the fuel passage 26. An upstream end of the stator core 20 (an upper end portion in FIG. 1) is connected to an external fuel supply unit (not shown). Thus, gas fuel to be supplied from the fuel supply unit will flow into the through hole 20*a* (the fuel passage 26) through the upstream end of the through hole 20*a*. The stator core 20 is made of soft magnetic material (e.g., electromagnetic stainless steel).

The casing 22 is placed in a position downstream of the stator core 20 in a flowing direction of the gas fuel, i.e., on a lower side in FIG. 1. The casing 22 has a nearly cylindrical shape and formed with a through hole 22*a* in the center. This casing 22 is made of soft magnetic material (e.g., electromagnetic stainless steel). In the casing 22, or the through hole 22*a*, the valve element 12 and the valve seat 14 are contained.

The valve element 12 is placed in a position upstream of the valve seat 14 in the gas fuel flowing direction, i.e., on an upper side in FIG. 1, in the through hole 22*a* of the casing 22. The valve element 12 is made of soft magnetic material (e.g., electromagnetic stainless steel) except the sealing member 42.

The valve element 12 has a bottom-closed cylindrical shape (a nearly cylindrical shape), that is, consists of a cylindrical portion and a bottom portion. Specifically, the valve element 12 includes a cylindrical part 32 having a nearly cylindrical shape corresponding to the cylindrical portion of the bottom-closed cylindrical shape, a sealing part 34 having a nearly circular-disc shape corresponding to the bottom portion of the bottom-closed cylindrical shape, and others.

The cylindrical part 32 includes a flow passage 36, transverse holes 38, and others. The flow passage 36 is formed by an inner peripheral surface 32*a* of the cylindrical part 32 to extend in a central axis direction (an up-down direction in FIG. 1) of the valve element 12. The transverse holes 38 are formed, more than one, at a downstream end of the flow passage 36 so that each hole 38 extend in a radial direction of the valve element 12 (left and right directions, and far-side direction and near-side direction with respect to the drawing sheet of FIG. 1) so as to communicate with the through hole 22*a* of the casing 22. In the present embodiment, four transverse holes 38 are formed, but the number of the transverse holes 38 is not particularly limited to four.

Each of the flow passage 36 and the transverse holes 38 serves as a flow passage for flowing gas fuel and constitutes part of the fuel passage 26. Specifically, the fuel passage 26 consists of the through hole 20*a* of the stator core 20, the flow passage 36 and transverse holes 38 of the valve element 12, and the through hole 22*a* of the casing 22.

The sealing part 34 is a part which will come into contact with and separate from the valve seat 14. To be specific, the sealing part 34 has a nearly circular-disc shape and is provided with an outside facing surface 40, the sealing member 42, and others.

The outside facing surface 40 is a lower end face of the valve element 12, namely, a surface of the valve element 12 facing the valve seat 14. The outside facing surface 40 is formed radially outside the sealing member 42 and over the entire circumference of the sealing member 42. Further, the outside facing surface 40 is formed in a position in the central axis direction of the valve element 12 so as not to contact with a seat surface 46 of the valve seat 14 when the sealing member 42 comes into contact with the seat surface 46 during valve closing. The outside facing surface 40 is made of metal.

The sealing member 42 is formed of an elastic body made of rubber, resin, or the like. The details of the sealing member 42 will be described later.

The valve seat 14 is placed in a position downstream of the valve element 12 in the gas fuel flowing direction, i.e., on the lower side in FIG. 1, in the through hole 22*a* of the casing 22. The valve seat 14 is fixed to the casing 22.

The valve seat 14 is provided with a seat portion 44 having a circular-disc shape. This seat portion 44 includes the seat surface 46, an ejection hole 48, and others. The seat surface 46 is a surface formed in the seat portion 44 on a side facing the valve element 12. With this surface 46, the sealing member 42 of the valve element 12 will be brought into or out of contact. The ejection hole 48 is a through hole formed in the seat portion 44 in its center to extend in a central axis direction of the seat portion 44. This ejection hole 48 serves as a flow passage for gas fuel.

The compression spring 16 is placed in the through hole 20*a* of the stator core 20. The compression spring 16 is arranged to extend from the inside of the valve element 12 toward an upstream side thereof. This compression spring 16 is held in a compressed state to urge the valve element 12 toward the valve seat 14.

Next, actions (operations) of the fuel injection apparatus 1 will be described below.

While no current is supplied to the electromagnetic coil 24 through the terminal pins 28 of the connector part 30, that is, during valve closing, the sealing member 42 of the valve element 12 is held in contact with the seat surface 46 of the valve seat 14 by the urging force of the compression spring 16 as shown in FIG. 1. Accordingly, the ejection hole 48 of the valve seat 14 is disconnected from the fuel passage 26. Thus, the gas fuel is not permitted to flow out of the fuel injection apparatus 1 through the ejection hole 48.

In contrast, while electric current is supplied to the electromagnetic coil 24 through the terminal pins 28 of the connector part 30, that is, during valve opening, the electromagnetic coil 24 generates magnetic fields, thereby exciting the valve element 12 and the stator core 20. Then, the valve element 12 and the stator core 20 attract each other, causing the valve element 12 to move toward the stator core 20. Specifically, the sealing member 42 of the valve element 12 is separated from the seat surface 46 of the valve seat 14. Thus, the ejection hole 48 of the valve seat 14 is placed in communication with the fuel passage 26.

To be concrete, the ejection hole 48 becomes communicated with the fuel passage 26 through a clearance between the sealing member 42 of the valve element 12 and the seat surface 46 of the valve seat 14 and a clearance between the outside facing surface 40 of the valve element 12 and the seat surface 46. Accordingly, the gas fuel flowing in the fuel passage 26 is allowed to flow through the clearance between the outside facing surface 40 and the seat surface 46 and the clearance between the sealing member 42 and the seat surface 46 and into the ejection hole 48. Then, the gas fuel is released out of the fuel injection apparatus 1 from the ejection hole 48.

Next, the sealing member 42 in the present embodiment will be described below. As shown in FIG. 1, the sealing member 42 is placed on the sealing part 34 of the valve element 12 so as to face the valve seat 14. The sealing member 42 is an elastic body formed in a circular-disc shape. As an alternative, the sealing member 42 may be formed in an annular shape.

Figure 2:
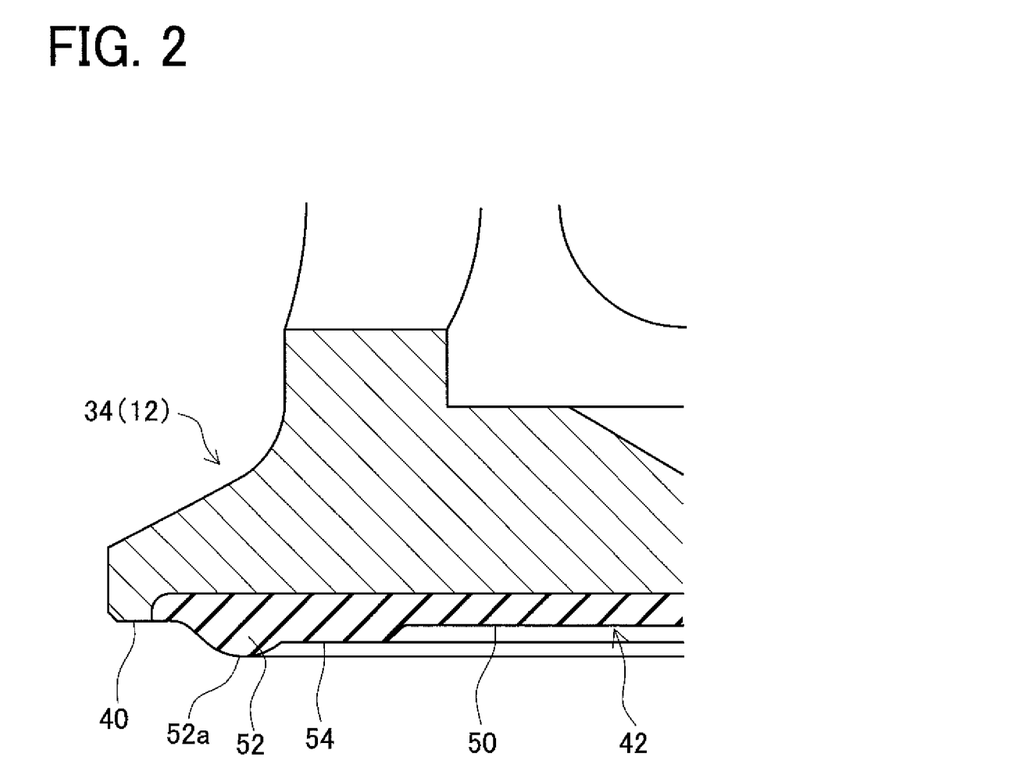
FIG. 2 is an enlarged sectional view of a sealing part of a valve element.

As shown in FIG. 2, the sealing member 42 includes a base plane 50, a protrusion 52, a flat portion 54, and others.

The base plane 50 is a surface facing the valve seat 14. This base plane 50 is provided in a region within a circle with a predetermined radius about a central axis of the sealing member 42 in a radial direction of the sealing member 42. Further, the base plane 50 is located in a position more inside than the protrusion 52 and the flat portion 54 in the radial direction of the sealing member 42.

The radial direction of the sealing member 42 is a right-left direction in FIG. 2, which is equal to the radial direction of the valve element 12 and a radial direction of the valve seat 14. The position more inside in the radial direction of the sealing member 42 represents a position on the side close to the central axis of the sealing member 42 in the radial direction of the sealing member 42. In contrast, the position more outside in the radial direction of the sealing member 42 represents a position on the side far from the central axis of the sealing member 42 in the radial direction of the sealing member 42.

The protrusion 52 is formed to annularly extend over the entire circumference in a circumferential direction of the sealing member 42. The protrusion 52 is formed in a position more outside than the base plane 50 and the flat portion 54 in the radial direction of the sealing member 42. The protrusion 52 protrudes toward the valve seat 14 (downward in FIG. 2) than the outside facing surface 40 of the valve element 12.

The flat portion 54 is a surface facing the valve seat 14. This flat portion 54 is formed in a position more outside than the base plane 50 in the radial direction of the sealing member 42 and also in a position more inside than the protrusion 52 in the radial direction of the sealing member 42. In other words, the flat portion 54 is provided in a position between the base plane 50 and the protrusion 52 in the radial direction of the sealing member 42.

Further, the flat portion 54 extends from the protrusion 52. That is, the flat portion 54 is provided to be continuous with and extend from the protrusion 52. The flat portion 54 is formed in a flat and annual shape extending over the entire circumference in the circumferential direction of the sealing member 42.

In a central axis direction of the sealing member 42 (i.e., an up-down direction in FIG. 2), the flat portion 54 is provided in a position between the outside facing surface 40 and an end (a distal end) 52a of the protrusion 52 located on a side toward the valve seat 14. Specifically, in the central axis direction of the sealing member 42, the flat portion 54 is formed in a position on a side toward the valve seat 14 than the outside facing surface 40 and in a position on a side close to the outside facing surface 40 than the distal end 52a of the protrusion 52.

Figure 3:
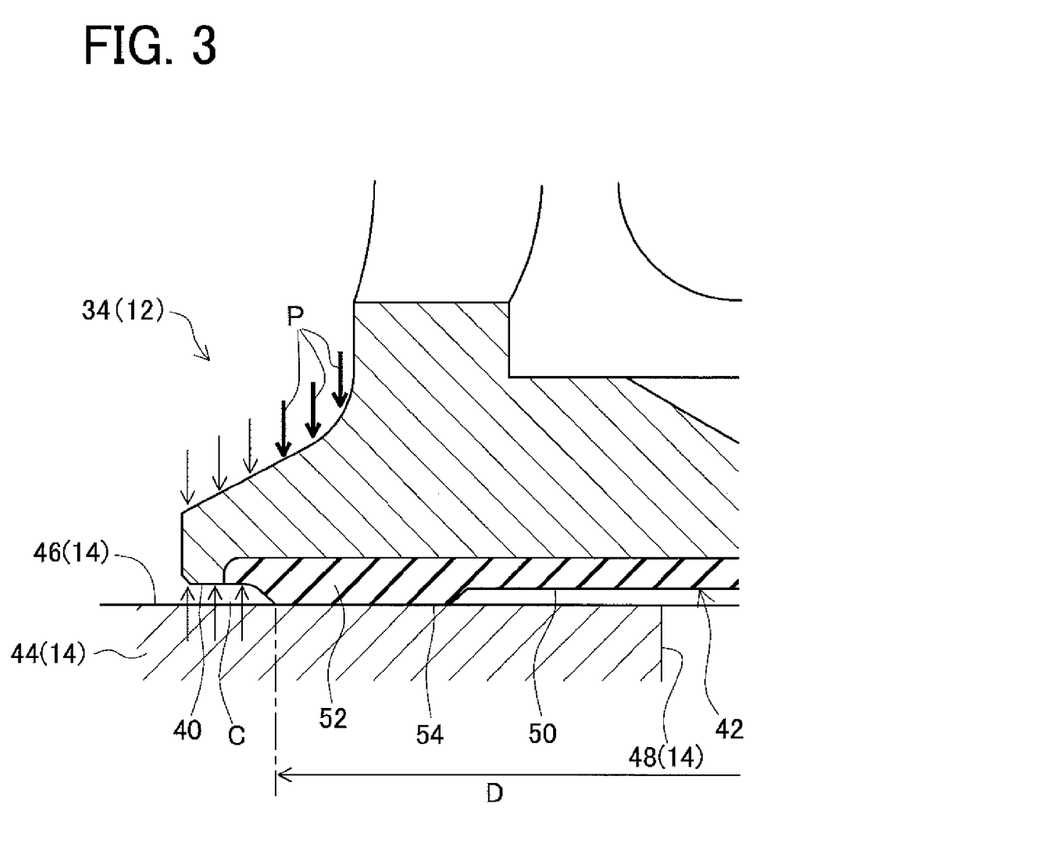
FIG. 3 is an enlarged sectional view of the valve element and a surrounding part of a valve seat during valve closing.

As shown in FIG. 3, the flat portion 54 comes into contact with the seat surface 46 of the valve seat 14 during valve closing in which the protrusion 52 is deformed or squashed by contact with the seat surface 46 of the valve seat 14. The flat portion 54 has a wider area and thus more unlikely to be deformed than the protrusion 52. The dimension of the area of the flat portion 54 in the radial direction of the sealing member 42 and the height of the flat portion 54 in the central axis direction of the sealing member 42 are determined based on the deformed amount of the protrusion 52 and the load of the sealing part 34 of the valve element 12 applied when the sealing part 34 presses against the seat surface 46 of the valve seat 14.

In the present embodiment described above, the sealing member 42 is provided with the flat portion 54, which comes into contact with the seat surface 46 of the valve seat 14 during valve closing.

During valve closing, as above, the flat portion 54 also contacts with the seat surface 46 of the valve seat 14 as well as the protrusion 52. Accordingly, during valve closing, the area of respective contact portions of the sealing member 42 and the seat surface 46 of the valve seat 14 is larger than that in a configuration not having the flat portion 54. Therefore, the pressure applied to the sealing member 42 from the seat surface 46 of the valve seat 14 during valve closing is also dispersed into the flat portion 54 as well as the protrusion 52. Thus, the pressure applied to the protrusion 52 is reduced during valve closing, the deformed amount of the protrusion 52 is suppressed. Specifically, when the deformed protrusion 52 establishes sealing between the valve element 12 and the valve seat 14 (closing of a flow passage), the flat portion 54 suppresses the deformed amount of the protrusion 52.

Accordingly, even when the sealing member 42 is used for a long term, the protrusion 52 is less likely to collapse (deteriorate) and hence the deformed amount of the protrusion 52 due to collapse is reduced. This suppresses deterioration of the elastic force of the protrusion 52 acting on the seat surface 46 of the valve seat 14 during valve closing, thereby preventing deterioration in sealing performance of the sealing member 42. Further, during valve opening in which the sealing member 42 of the valve element 12 is separated from the seat surface 46 of the valve seat 14, the distance between the distal end 52a of the protrusion 52 and the seat surface 46 of the valve seat 14 remains nearly unchanged as compared with the configuration not having the flat portion 54. This suppresses variations in stroke amount (movement amount) of the valve element 12 when the valve element 12 is moved to open and close.

The flat portion 54 is formed between the outside facing surface 40 and the distal end 52a of the protrusion 52 on the side toward the valve seat 14 in the central axis direction of the sealing member 42. During valve closing, accordingly, the flat portion 54 contacts with the valve seat 14 so that a clearance C (see FIG. 3) is formed between the outside facing surface 40 and the valve seat 14, holding the outside facing surface 40 in a position separated from, or out of contact with, the seat surface 46 of the valve seat 14. This suppresses the occurrence of noise due to opening/closing of the valve element 12.

The present embodiment described above can suppress deterioration in sealing performance of the sealing member 42 while reducing the occurrence of noise.

In the present embodiment, the flat portion 54 is formed more inside than the protrusion 52 in the radial direction of the sealing member 42.

Accordingly, as shown in FIG. 3, the seal diameter D (the maximum diameter of the contact portion of the sealing member 42 with the seat surface 60 of the valve seat 14) becomes the maximum diameter of the contact portion of the protrusion 52. The seal diameter D is equal to or nearly unchanged from a configuration not having the flat portion 54. Therefore, there is less difference in seal diameter D between a sealing member 42 not having the flat portion 54 and the sealing member 42 formed with the flat portion 54.

Herein, a relationship between the dimension of the seal diameter D and the force required to move up the valve element 12 during valve closing will be described. As indicated with thick arrows in FIG. 3, during valve closing, the fuel pressure P (the pressure of gas fuel) in the central axis direction of the valve element 12 acts on the sealing part 34 of the valve element 12 within a range of the seal diameter D. In contrast, the fuel pressure P acting on the sealing part 34 outside the seal diameter D is canceled out as indicated with thin arrows in FIG. 3.

Since the sealing member 42 formed with the flat portion 54 is less different in the seal diameter D from a sealing member 42 not having the flat portion 54 as described above, the fuel pressure P acting on the sealing part 34 of the valve element 12 will remain nearly the same. Accordingly, the force required to move up the valve element 12 from a valve closed position toward a valve open position remains nearly equal. Thus, the flat portion 54 located more inside than the protrusion 52 in the radial direction of the sealing member 42 can contribute to suppressing the rise in the electric quantity to be consumed for valve opening of the valve element 12 from the valve closed position.

Moreover, the flat portion 54 is formed to be continuous with the protrusion 52 and in an annual form.

Accordingly, during valve closing, the pressure exerted on the sealing member 42 contacting with the valve seat 14 is effectively dispersed into the flat portion 54. During valve closing, therefore, the deformed amount of the protrusion 52 can be suppressed effectively. Even when the sealing member 42 is used for a long period, the deformed amount of the protrusion 52 is effectively reduced. This can effectively prevent deterioration in sealing performance of the sealing member 42 and also effectively reduce variations in stroke amount of the valve element 12.

The foregoing embodiment may include the following modified embodiments.

Figure 4:
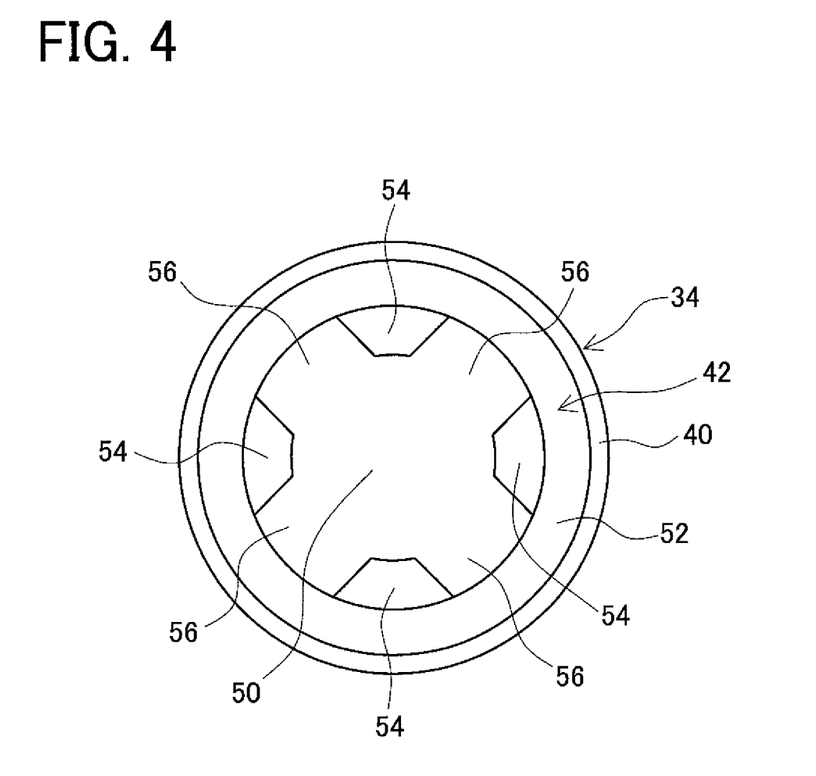
FIG. 4 is a view showing a first modified embodiment of a valve element seen from a valve seat side.

As a first modified embodiment, the sealing member 42 may be formed with slits 56 as shown in FIG. 4. In this first modified embodiment, specifically, a plurality of the flat portions 54 are arranged at predetermined intervals (in this embodiment, at equal intervals) in the circumferential direction of the sealing member 42. The slits 56 are formed one each between adjacent flat portions 54 in the circumferential direction of the sealing member 42. These slits 56 are the space formed in a region extending from the base plane 50 toward the valve seat 14 in the central axis direction (in a direction vertical to the drawing sheet of FIG. 4) of the sealing member 42. In the example shown in FIG. 4, four flat portions 54 and four slits 56 are formed. However, the number of the flat portions 54 and the number of the slits 56 are not particularly limited to four, and they need only be two or more.

In the foregoing first modified embodiment, the slits 56 are formed one each between the adjacent flat portions 54 arranged in the circumferential direction of the sealing member 42. Accordingly, since the space corresponding to the volume of each slit 56 is provided between the sealing member 42 and the valve seat 14, the flow passage area of the gas fuel passage defined by the sealing member 42 and the valve seat 14 is large during valve opening. This can further ensure a large flow rate of gas fuel.

Figure 5:
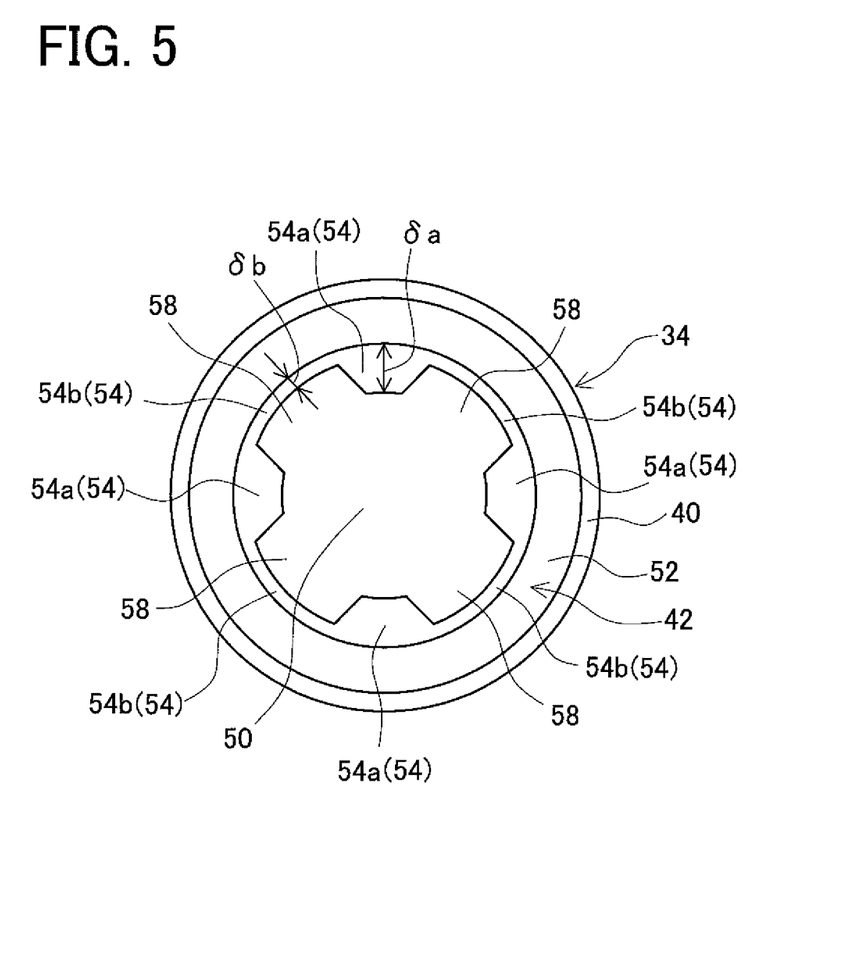
FIG. 5 is a view showing a second modified embodiment of a valve element seen from a valve seat side.

As a second modified embodiment, as shown in FIG. 5, slits 58 may be formed. In this second modified embodiment, specifically, the flat portion 54 includes a plurality of first portions 54a and a plurality of second portions 54b, which are alternately arranged in the circumferential direction of the sealing member 42. The width δa of each first portion 54a in the radial direction of the sealing member 42 is larger than the width δb of each second portion 54b in the radial direction of the sealing member 42. The slits 58 are formed one each between the adjacent first portions 54a in the circumferential direction of the sealing member 42. These slits 58 are the space formed in a region extending from the base plane 50 toward the valve seat 14 in the central axis direction (in a direction vertical to the drawing sheet of FIG. 5) of the sealing member 42. In this embodiment shown in FIG. 5, the first portions 54a and the second portions 54b of the flat portion 54 and the slits 58 are formed four each. However, the number of those first portions 54a and second portions 54b of the flat portion 54 and the number of the slits 58 are not particularly limited to four, and need only be two or more.

In the foregoing second modified embodiment, the slits 58 are formed one each between the adjacent first portions 54a of the flat portion 54 in the circumferential direction of the sealing member 42. Accordingly, since the space corresponding to the volume of each slit 58 is provided between the sealing member 42 and the valve seat 14, the flow passage area of a gas fuel passage to be formed between the sealing member 42 and the valve seat 14 during valve opening is large. This can further ensure a large flow rate of gas fuel.

Figure 6:
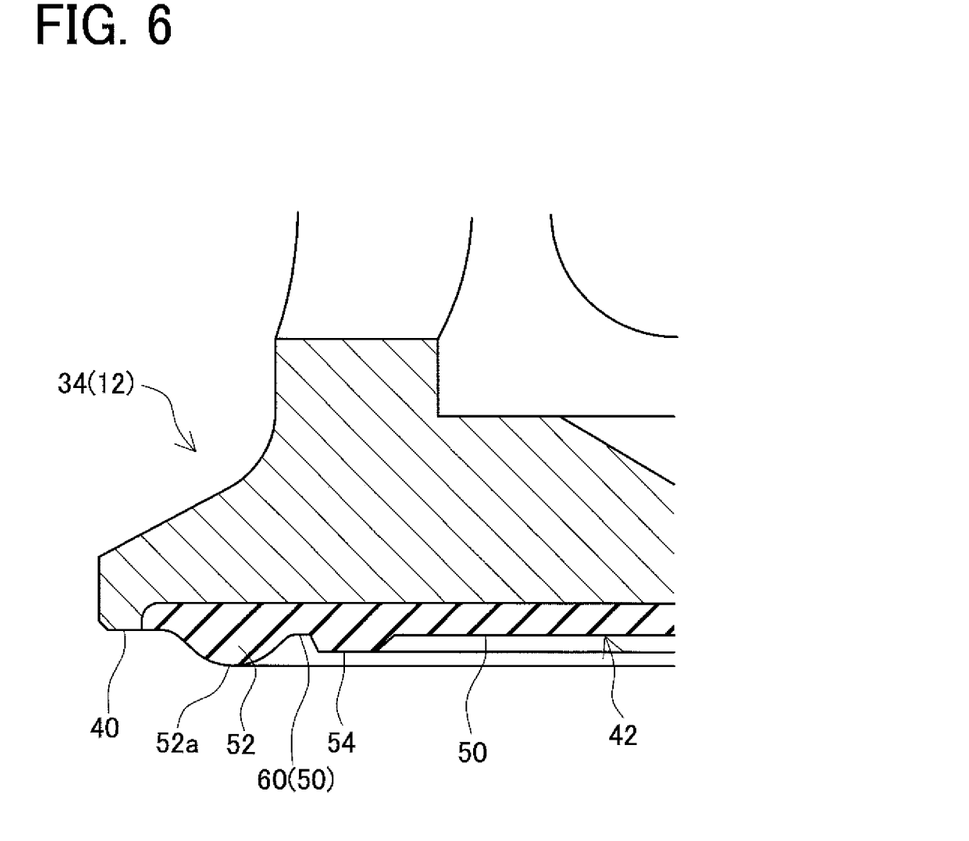
FIG. 6 is a view showing a third modified embodiment of a valve element.

As a third modified embodiment, as shown in FIG. 6, the flat portion 54 may be formed separately from the protrusion 52. In this case, a recess or groove 60 is formed between the flat portion 54 and the protrusion 52. In this embodiment shown in FIG. 6, the bottom (the surface facing the valve seat 14) of the recess 60 is formed of a part of the base plane 50.

Accordingly, when the sealing member 42 contacts with the valve seat 14 during valve closing, deforming the protrusion 52 of the sealing member 42, the recess 60 receive such a deformed portion of the protrusion 52. This makes it easier for the protrusion 52 to deform, thus achieving improved sealing performance of the sealing member 42.

Figure 7:
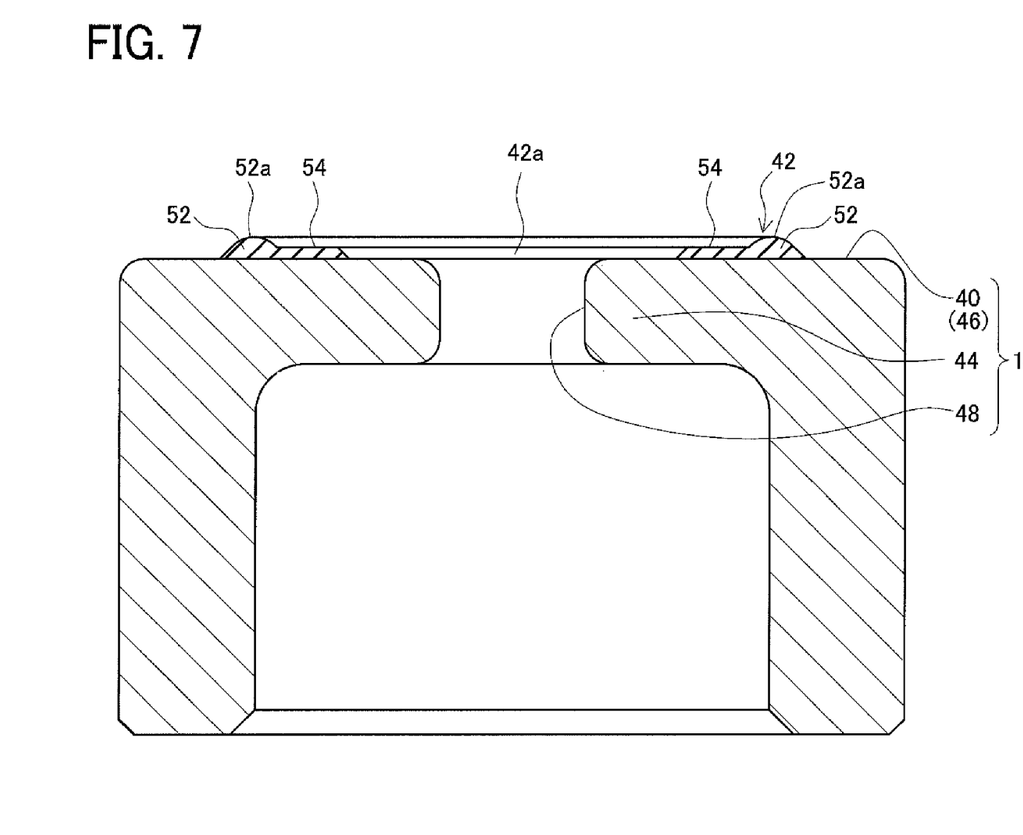
FIG. 7 is a view showing a fourth modified embodiment of a valve element.

As a fourth modified embodiment, as shown in FIG. 7, the sealing member 42 may be provided on the valve seat 14, not on the valve element 12. More specifically, the sealing member 42 has an annular shape including a through hole 42a formed through the sealing member 42 in the center thereof. Thus, the valve seat 14 is provided with the outside facing surface 40, which is a surface facing the valve element 12, formed in a position more outside than the sealing member 42 in the radial direction of the sealing member 42. That is, the outside facing surface 40 is formed in the valve seat 14, not in the valve element 12.

In the fourth modified embodiment, the sealing member 42 is provided with an annular protrusion 52 more protruding toward the valve element 12 than the outside facing surface 40. This sealing member 42 is provided with the flat portion 54 formed between the outside facing surface 40 and the distal end 52a of the protrusion 52 on a side toward the valve element 12 in the central axis direction of the sealing member 42 and will contact with the valve element 12 during valve closing.

The foregoing embodiments are mere examples and give no limitation to the present invention. The present invention may be embodied in other specific forms without departing from the essential characteristics thereof.

For instance, the flat portion 54 may be formed in an entire region of the sealing member 42 in the radial direction thereof with respect to the annular protrusion 52. In other words, the sealing member 42 may not be provided with the base plane 50.

For instance, the flat portion 54 may be formed more outside than the annular protrusion 52 in the radial direction of the sealing member 42.

REFERENCE SIGNS LIST

1 Fuel injection apparatus
12 Valve element
14 Valve seat
16 Compression spring
18 Housing
20 Stator core
22 Casing
24 Electromagnetic coil
26 Fuel passage
34 Sealing part
40 Outside facing surface
42 Sealing member
44 Seat portion
46 Seat surface
50 Base plane
52 Protrusion
52a Distal end
54 Flat portion
56 Slit
58 Slit
60 Recess
P Fuel pressure
D Seal diameter
C Clearance

What is claimed is:

1. A fuel supply apparatus comprising:
a valve seat;
a valve element which will come into contact or separate from the valve seat; and
a sealing member formed of an elastic body having one of a circular-disc shape and an annular shape, the sealing member being placed in one of the valve element and the valve seat to face the other, the one being defined as a first member and the other is defined as a second member,
wherein the first member includes an outside facing surface corresponding to a surface facing the second member, the outside facing surface being formed more outside than the sealing member in a radial direction of the sealing member, and
the sealing member comprises:
an annular protrusion protruding toward the second member more than the outside facing surface, and
a flat portion formed between the outside facing surface and a distal end of the protrusion on a side toward the second member in a central axis direction of the sealing member, the flat portion being to contact with the second member during valve closing,
the flat portion is formed in a position more inside than the protrusion in the radial direction of the sealing member,
the flat portion includes a plurality of first portions and a plurality of second portions alternately arranged in a circumferential direction of the sealing member,
the first portions each have a width larger than a width of the second portions in the radial direction of the sealing member, and
the sealing member is formed with a slit between adjacent two of the first portions in the circumferential direction of the sealing member.

2. The fuel supply apparatus according to claim 1, wherein the flat portion is formed in a position more inside than the protrusion in the radial direction of the sealing member.

3. The fuel supply apparatus according to claim 1, wherein
the flat portion is formed separately from the protrusion, and
a recess is formed between the protrusion and the flat portion.

4. A fuel supply apparatus comprising:
a valve seat;
a valve element which will come into contact or separate from the valve seat; and
a sealing member formed of an elastic body having one of a circular-disc shape and an annular shape, the sealing member being placed in one of the valve element and the valve seat to face the other, the one being defined as a first member and the other is defined as a second member,
wherein the first member includes an outside facing surface corresponding to a surface facing the second member, the outside facing surface being formed more outside than the sealing member in a radial direction of the sealing member, and
the sealing member comprises:
an annular protrusion protruding toward the second member more than the outside facing surface, and
a flat portion formed between the outside facing surface and a distal end of the protrusion on a side toward the second member in a central axis direction of the sealing member, the flat portion being to contact with the second member during valve closing,
the flat portion includes a plurality of flat portions arranged at predetermined intervals in a circumferential direction of the sealing member, and the sealing member is formed with a slit between adjacent two of the flat portions in the circumferential direction of the sealing member.

5. The fuel supply apparatus according to claim 4, wherein the flat portion is formed in a position more inside than the protrusion in the radial direction of the sealing member.

6. The fuel supply apparatus according to claim 4, wherein the flat portion is formed separately from the protrusion, and a recess is formed between the protrusion and the flat portion.

\* \* \* \* \*